US012281508B2

(12) United States Patent
Prison

(10) Patent No.: US 12,281,508 B2
(45) Date of Patent: Apr. 22, 2025

(54) AUTOMOBILE HINGE

(71) Applicant: Edscha Engineering GmbH, Remscheid (DE)

(72) Inventor: Stefan Prison, Remscheid (DE)

(73) Assignee: Edscha Engineering GmbH, Remscheid (DE)

( * ) Notice: Subject to any disclaimer, the term of this patent is extended or adjusted under 35 U.S.C. 154(b) by 0 days.

(21) Appl. No.: 18/118,312

(22) Filed: Mar. 7, 2023

(65) Prior Publication Data

US 2023/0287718 A1 Sep. 14, 2023

(30) Foreign Application Priority Data

Mar. 8, 2022 (DE) ..................... 10 2022 105 466.7

(51) Int. Cl.
*E05D 3/02* (2006.01)
*E05D 11/02* (2006.01)

(52) U.S. Cl.
CPC ................ *E05D 3/02* (2013.01); *E05D 11/02* (2013.01); *E05Y 2900/531* (2013.01)

(58) Field of Classification Search
CPC ........... E05D 3/02; E05D 11/02; E05D 5/062; E05Y 2900/531; E05F 1/061; E05F 1/063; E05F 1/065; E05F 1/066
See application file for complete search history.

(56) References Cited

U.S. PATENT DOCUMENTS

| | | | | | |
|---|---|---|---|---|---|
| 948,788 | A * | 2/1910 | Matthews | E05F 1/066 | 49/239 |
| 1,608,299 | A * | 11/1926 | Carpenter et al. | E05F 1/065 | 16/315 |
| 1,691,759 | A * | 11/1928 | Fischer | E05F 1/066 | 16/314 |

(Continued)

FOREIGN PATENT DOCUMENTS

| | | | |
|---|---|---|---|
| DE | 29813457 | U1 | 12/1999 |
| DE | 102005023543 | A1 | 11/2006 |

(Continued)

*Primary Examiner* — Jack W Lavinder
*Assistant Examiner* — Matthew J Sullivan
(74) *Attorney, Agent, or Firm* — Davidson Kappel LLC

(57) ABSTRACT

An automobile hinge includes a first hinge half attachable to one of a door and a door pillar, with a first hinge bore, a second hinge half attachable to the other of the door and the door pillar, with a second hinge bore, and a hinge pin having an axis of rotation. The hinge pin comprises a first pin portion which can be fixed in a rotationally fixed manner in the first hinge bore of the first hinge half. The hinge pin comprises a second pin portion which is pivotally received in the second hinge bore of the second hinge half. The second pin portion comprises an external thread at least in sections. The second hinge bore of the second hinge half comprises an internal thread at least in sections. The second pin portion can be screwed into the second hinge bore of the second hinge half. An automobile hinge in which the pivotable connection of hinge pin and hinge half is possible (Continued)

without a bearing bush is realized in that the internal thread and the external thread form a direct pivotal connection of the hinge pin and the second hinge half.

18 Claims, 2 Drawing Sheets

(56) References Cited

U.S. PATENT DOCUMENTS

| | | | | | |
|---|---|---|---|---|---|
| 1,698,390 | A * | 1/1929 | Carpenter | E05F 1/065 | 16/315 |
| 3,134,134 | A * | 5/1964 | McCubbin | E05F 1/063 | 16/312 |
| 4,228,562 | A * | 10/1980 | Hsu | E05F 1/066 | 16/313 |
| 4,259,763 | A * | 4/1981 | Hsu | E05F 1/066 | 16/314 |
| 4,391,020 | A * | 7/1983 | Hsu | E05F 1/066 | 16/314 |
| 4,937,916 | A * | 7/1990 | Redman | E05D 5/10 | 16/265 |
| 6,739,020 | B1 * | 5/2004 | Morawetz | E05D 11/1071 | 16/337 |
| 6,922,872 | B2 * | 8/2005 | Gruber | E05D 5/14 | 16/386 |
| 7,325,276 | B2 * | 2/2008 | Kim | E05D 5/128 | 16/262 |
| 7,461,432 | B2 * | 12/2008 | Lowen | E05D 11/1071 | 16/334 |
| 7,891,054 | B2 * | 2/2011 | Nicolas Domingo | E05D 11/084 | 16/334 |
| 7,908,712 | B2 * | 3/2011 | Rudzewski | E05D 11/06 | 16/334 |
| 8,007,025 | B2 * | 8/2011 | Kohr | E05D 5/043 | 296/202 |
| 8,156,611 | B2 * | 4/2012 | Machin | E05D 7/121 | 16/261 |
| 8,505,166 | B2 * | 8/2013 | Mitchell | E05F 1/066 | 16/315 |
| 8,510,914 | B2 * | 8/2013 | Minegishi | E05D 11/1057 | 16/334 |
| 8,689,403 | B2 * | 4/2014 | Lowen | E05D 11/1071 | 16/334 |
| 10,165,870 | B2 * | 1/2019 | Artwohl | E04B 1/803 | |
| 10,288,343 | B2 * | 5/2019 | Ramm | F25D 23/028 | |
| 10,619,391 | B2 * | 4/2020 | Yoo | E05D 7/121 | |
| 10,941,596 | B2 * | 3/2021 | Hoenig | F16C 33/208 | |
| 11,352,822 | B2 * | 6/2022 | Brown | E05F 1/063 | |
| 11,434,676 | B2 * | 9/2022 | Morinaga | F16C 11/04 | |
| 11,466,490 | B2 * | 10/2022 | Bassan | E05D 9/005 | |
| 11,473,357 | B2 * | 10/2022 | Bender | E05D 7/10 | |
| 11,624,224 | B2 * | 4/2023 | Kovach | E05D 5/0207 | 16/262 |
| 11,746,581 | B2 * | 9/2023 | Krolewski | E05D 7/1016 | 16/380 |
| 11,788,332 | B2 * | 10/2023 | Jadhav | E05D 11/1078 | 16/221 |
| 11,982,117 | B2 * | 5/2024 | Lanzl | E05F 1/063 | |
| 2003/0093873 | A1 * | 5/2003 | Linnenbrink | E05D 11/1085 | 16/85 |
| 2003/0140455 | A1 * | 7/2003 | Audisio | E05C 21/005 | 16/334 |
| 2004/0231104 | A1 * | 11/2004 | Kingelhofer | E05D 11/084 | 16/342 |
| 2006/0090297 | A1 * | 5/2006 | Chue | E05D 5/04 | 16/312 |
| 2006/0273621 | A1 * | 12/2006 | Shaw | E05D 7/121 | 296/146.11 |
| 2009/0140551 | A1 * | 6/2009 | Stalhammar | B62D 25/04 | 296/193.06 |
| 2012/0079683 | A1 * | 4/2012 | Spragg | E05D 11/02 | 16/274 |
| 2022/0042362 | A1 * | 2/2022 | Freedman | E05D 5/12 | |
| 2022/0243510 | A1 * | 8/2022 | Prison | E05D 5/128 | |

FOREIGN PATENT DOCUMENTS

| | | | | |
|---|---|---|---|---|
| JP | 02136682 | A * | 5/1990 | |
| KR | 20120008759 | A * | 2/2012 | |
| WO | WO-2006125535 | A1 * | 11/2006 | E05D 3/02 |

* cited by examiner

AUTOMOBILE HINGE

The present disclosure relates to an automobile hinge, comprising a first hinge half attachable to one of a door and a door frame, with a first hinge bore, a second hinge half attachable to the other of the door and the door frame, with a second hinge bore, and a hinge pin having an axis of rotation, wherein the hinge pin comprises a first pin portion which can be fixed in a rotationally fixed manner in the first hinge bore of the first hinge half, and wherein the hinge pin comprises a second pin portion which is pivotally received in the second hinge bore of the second hinge half.

BACKGROUND

From practice, such automobile hinges are known, wherein for the pivotally movable connection of the second pin portion to the second hinge bore, a bearing bush is provided on the corresponding hinge pin portion, which ensures the secure pivotally movable mounting of the second hinge bore about the corresponding second pin portion. A disadvantage of such automobile hinges is the poor disposability of the bearing bushing. Such bearing bushings are often made of Teflon (PTFE, polytetrafluoroethylene), which cannot easily be put into the same recycling process as the hinges, and which is environmentally unfriendly during manufacture. The known hinges are usually riveted or screwed to the corresponding hinge halves, which is a relatively error-prone process. In particular, the forces acting on the riveting in the event of an automobile accident are high and can tear the riveting.

DE 10 2005 023 543 A1 shows an automobile hinge comprising a first hinge half attachable to one of a door and a door pillar having a first bearing location and a second bearing location, the first bearing location comprising a first hinge bore, the second bearing location comprising a second hinge bore, and a second hinge half attachable to the other of the door and the door pillar comprising a third hinge bore. The automobile hinge further comprises a hinge pin having an axis of rotation, the hinge pin having a first pin portion that is non-rotatably securable in the first hinge bore of the first hinge half via a threaded mating. In addition, the hinge pin has a second pin portion which is received in the third hinge bore of the second hinge half in a pivotally movable manner by means of a bushing.

DE 298 13 457 U1 describes an automobile hinge, comprising a first hinge half attachable to one of a door and a door frame, having a first hinge bore therethrough, and a second hinge half attachable to the other of the door and the door frame, having a second hinge bore therethrough, and a hinge pin in the form of a screw bolt having a screw bolt head and an axis of rotation, wherein the hinge pin comprises a first pin portion adjacent to the screw bolt head which can be fixed in a rotationally fixed manner in the first hinge bore of the first hinge half. Adjoining thereto, the hinge pin comprises a second pin portion which is received in the second hinge bore of the second hinge half so as to be pivotable via a bearing bush. Finally, the hinge pin also comprises a third pin portion which adjoins the second pin portion and which has an external thread which can be screwed into an internal thread of the second hinge bore of the second hinge half. When the first hinge half is pivoted with the hinge pin relative to the second hinge half, tightening of the external thread in the internal thread occurs and a braking torque, which increases as the opening angle of the first hinge half increases, is generated. A disadvantage of the known automobile hinge is the provision of the bearing bush, which is difficult to dispose of. Furthermore, the external thread on the hinge pin and the internal thread in the second hinge half are configured in such a way that an increased braking torque occurs during pivoting, which is generally undesirable.

SUMMARY

It is an object of the present disclosure to specify an automobile hinge in which the pivotable connection of hinge pin and hinge half is possible without a bearing bush.

This object is achieved by an automobile hinge of the present disclosure.

According to an aspect of the present disclosure, there is provided an automobile hinge, comprising a first hinge half attachable to one of a door and a door pillar, the first hinge half comprising a first hinge bore, a second hinge half attachable to the other of the door and the door pillar, the second hinge half comprising a second hinge bore, and a hinge pin having an axis of rotation, wherein the hinge pin comprises a first pin portion which can be fixed in a rotationally fixed manner in the first hinge bore of the first hinge half, wherein the hinge pin comprises a second pin portion which is pivotally received in the second hinge bore of the second hinge half, wherein the second pin portion comprises an external thread at least in sections, wherein the second hinge bore of the second hinge half comprises an internal thread at least in sections, wherein the second pin portion can be screwed into the second hinge bore of the second hinge half, and wherein the internal thread of the second hinge bore and the external thread of the second pin portion form a direct pivotal connection of the hinge pin and the second hinge half.

According to an aspect of the present disclosure, there is provided an automotive hinge, comprising a first hinge part assigned to one of a flap and a vehicle body part, the first hinge part comprising a first hinge bore, a second hinge part assigned to the other of the flap and the vehicle body part, the second hinge part comprising a second hinge bore, and a hinge pin having an axis of rotation, wherein the hinge pin comprises a first pin portion which is fixed in a rotationally fixed manner in the first hinge bore of the first hinge part, wherein the hinge pin comprises a second pin portion which is pivotally received in the second hinge bore of the second hinge part, wherein the second pin portion comprises at least one external thread, wherein the second hinge bore of the second hinge part comprises at least one internal thread, wherein the at least one external thread of the second pin portion can be screwed into the at least one internal thread of the second hinge bore of the second hinge part, and wherein the internal thread of the second hinge bore and the external thread of the second pin portion co-operate to a direct pivotal connection of the hinge pin and the second hinge part.

According to an aspect of the present disclosure, an automobile hinge is provided comprising a first hinge half attachable to one of a door and a door frame, with a first hinge bore, a second hinge half attachable to the other of the door and the door frame, with a second hinge bore, and a hinge pin having an axis of rotation, wherein the hinge pin comprises a first pin portion non-rotatably securable in the first hinge bore of the first hinge half, wherein the hinge pin comprises a second pin portion which is received in the second hinge bore of the second hinge half in a pivotally movable manner, wherein the second pin portion comprises an external thread at least in sections, wherein the second hinge bore of the second hinge half comprises an internal thread at least in sections, and wherein the second pin portion can be screwed into the second hinge bore of the second hinge half. The automobile hinge here distinguishes in that the internal thread and the external thread form a direct pivotable connection of the hinge pin and the second hinge half. In this way, the provision of a bearing bush is favorably avoided; instead, the connection of the second hinge half with its second hinge bore is made directly, i.e. without an intermediate bearing bush, to the second pin portion of the hinge pin, and the pivoting movement is effected via the intermeshing internal thread and external thread. At the same time, the internal thread and the external thread enable the hinge pin to be screwed into the second hinge bore of the second hinge half and thus facilitate subsequent disassembly; moreover, it is not necessary to rivet the hinge pin in a region of the second hinge half. Finally, the flanks of the internal thread and external thread provide relatively high holding forces, even in the vertical direction, so that the risk of the hinge tearing in a frontal crash and lifting any door connected to it out of the frame is reduced. Particularly in the case of cars designed as electric vehicles, whose underbody is stiffer than previously self-supporting bodies due to the batteries installed, increased forces are introduced into the door bearing in the event of a collision. However, the flanks of the internal thread and external thread increase the holding forces of these two components under vertical stress.

Surprisingly, the direct pivoting connection of hinge pin and second hinge half via internal thread and external thread does not result in a higher braking torque when the hinge is actuated than was the case with conventional bearing bushings. Noise generation is also not increased, or not significantly, compared with conventional hinges with bearing bushes. The resulting hinges are easy to assemble and also easier to repair, since the components can be disassembled again in a simple and non-destructive manner. Accordingly, a bushing-free automobile hinge is created that meets the requirements for an automotive hinge in terms of number of load cycles, noise generation, reproducibility, paintability, dip paintability, and ease of use.

Preferably, the internal thread and the external thread are designed as a fine thread with a small pitch, whereby a lift of the vehicle door takes place in dependence on the opening angle of the door of less than one millimeter, wherin the lift can be reduced to 0.2 millimeters or less for a usual maximum pivotal angle of about 75°. As an alternative to a fine thread, a trapezoidal thread, again with a small pitch, may also be provided.

It is expediently provided that the thread is designed as a clockwise or counterclockwise thread in such a way that an increasing pitch must be overcome during an opening movement of the vehicle door, while during closing of the vehicle door, the pivoting movement is provided with a negative pitch, resulting in a closing aid that favors the dropping of the door into a lock, since the moment of resistance to be overcome during closing of the door is reduced. However, this means that one hinge pin with a left-hand thread and one hinge pin with a right-hand thread must be provided for a left-hand door and a right-hand door respectively, and the same hinge pin cannot be used in both doors.

Particularly preferably, the fine thread has a pitch of less than a quarter, preferably less than a third, of a conventional metric thread, in the case of a screw connection with a metric thread and a nominal diameter of 10 millimeters, for example, a screw connection M10×1.0 compared with the conventional metric threaded screw connection M10×1.5. Accordingly, the pitch of the fine thread is reduced by a third compared with the conventional thread. This is a favorable way of ensuring that the stroke of the door over the pivotal angle of approx. 75° is particularly small. However, it is also possible to provide an M10×1.0 screw connection in which the pitch of the fine pitch thread is reduced by two thirds compared with the conventional thread. Other suitable diameters of pin portions of the hinge pin are M8, M12 or others depending on the intended use.

In an expedient manner, it is provided that the second hinge bore of the second hinge half comprises a receiving area for a lubricant, such as a lubricating grease, which lubricates the cooperating internal threads and external threads and thus promotes smooth and quiet operation of the direct connection of said parts. Such a receiving area may be a lateral pocket or groove, but preferably it is provided that the receiving area ensures lubrication for life and that subsequent lubrication, for example via grease nipples or the like, is not required. However, the receiving area for a lubricant can also be provided in or on the second pin portion of the hinge pin, for example if the second pin portion provided with the external thread is perforated, for example with a recess on the end face or the like.

The lubricating grease may be a conventional grease provided for lubricating bearings.

According to a preferred embodiment, it is provided that the second hinge bore is designed as a blind bore in the second hinge half. This ensures, on the one hand, that the external thread is always inserted into the internal thread on the correct side and, moreover, eliminates a possibility of access by impurities or water in the broadest sense. A blind bore is particularly suitable for forming the axial protrusion as a receiving area for the lubricant, thereby providing lubrication for life.

Alternatively, the second hinge bore can also be designed as a through bore, in which case it is expedient to provide a seal at each end of the through bore in order to prevent impurities or the like from penetrating into the interacting internal thread and external thread. Such a seal can be provided, for example, by two 0-rings made of EPDM, which are inserted in corresponding circumferential grooves of the second pin portion.

A convenient embodiment is characterized in that the external thread comprises between three and thirty complete turns, preferably that the external thread comprises between five and twenty-five complete turns, particularly preferably that the external thread comprises between ten and twenty complete turns, and most preferably that the external thread comprises between fourteen and sixteen complete turns. The number of complete turns of the external thread with which it is screwed into the internal thread defines at the same time the braking torque when the second hinge half pivots with respect to the hinge pin and the resistance to vertical tearing forces. The specified ranges of numbers of turns have been found to be particularly favorable for providing both a low resisting torque during pivoting and a high resistance to tearing forces.

The external thread of the second pin portion expediently comprises a maximum of three thread starts, preferably a maximum of two thread starts, and particularly preferably a single thread start, which ensures that screwing the hinge pin into the second hinge half provides reproducible positioning. In particular, this means that the second pin portion can always be screwed completely into the second hinge bore in a favorable manner, and the distance between the end face of the second hinge half facing a collar and the collar is always minimized.

A sealing arrangement is expediently provided which secures the threads, i.e. the external thread and the internal thread, against leakage of lubricant. In a first favorable embodiment, the sealing arrangement comprises an annular washer made of EPDM, i.e. an ethylene-propylene-diene rubber, since rubber-elastic material has good spring properties and is particularly suitable as a sealant. The material is particularly resistant to ultraviolet radiation, ozone, acids and mechanical stress, and is also particularly temperature resistant. These properties of the sealing material allow the assembled hinge including sealing assembly with door connected thereto to undergo dip painting without the lubricant escaping due to the high temperatures. Even if the automobile hinge is recycled, EPDM can be melted down together with the steel.

In an alternative embodiment, the sealing arrangement is provided with an O-ring, for example, disposed in a radial circumferential groove of the second pin portion adjacent to the thread, which secures the second hinge bore against leakage of the lubricant. If the hinge bore is a through bore, two O-rings are to be provided accordingly.

A particularly favorable hinge is obtained if the hinge pin, between the first hinge portion and the second hinge portion, comprises a radial collar which decouples the two hinge halves. The collar also represents an end stop for screwing the second pin portion into the second hinge bore.

Preferably, the transition area between the external thread of the second pin portion and the radial collar has a rounding which expediently provides a circumferential contact line for the end face of the second hinge half.

A particularly favorable and simple sealing of the receiving area for the lubricant is obtained when the sealing arrangement comprises an annular sealing washer which can be arranged on an end face of the radial collar facing the second pin portion and which secures the threads, external thread and internal thread, against leakage before lubricant.

The annular sealing washer has a sufficiently large thickness to compensate for a stroke of 0.2 millimeters or even a stroke of 0.4 millimeters, which is overrun by the pitch of the threads when the door is pivoted open, in that the sealing washer expands elastically accordingly and closes off access to the thread.

Instead of lubrication with a lubricant, it is also possible to provide the flanks of the internal threads or external threads with a sliding coating that reduces the braking torque in a particularly favorable manner. In this case, it is no longer necessary or at any rate required to provide a lubricant.

According to a preferred embodiment, the second pin portion is connected to the second hinge bore without rivets, i.e. without riveting, which advantageously reduces the height of the hinge pin and saves corresponding weight. Furthermore, individual parts required for riveting, such as washers and the like, are eliminated, so that the number of parts is also reduced.

A particularly favorable pivoting mobility of the second hinge half results if the second pin portion equipped with an external thread has a nominal diameter (for example M10: 10 mm) corresponding to the height of the thread over the circumference and thus to the screw-in depth, with a tolerance of +1-20%. Thus, for an M10 thread, the height of the external thread is between 8 mm and 12 mm, particularly preferably +1-10%, i.e. between 9 mm and 11 mm, preferably 10 mm. For an M12 thread, the height of the external thread is between 9.6 mm and 14.4 mm, preferably 12 mm. For an M8 thread, the height of the external thread is between 7.4 mm and 9.6 mm, preferably 8 mm. As a result, the second pin portion can be quite short (this then also applies to the thickness of the second hinge half) and material and weight can be saved.

Further advantages, features, characteristics and developments of the present disclosure will be apparent from the following description of preferred embodiments.

BRIEF SUMMARY OF THE DRAWINGS

The present disclosure is explained in more detail below with reference to the accompanying drawings.

DETAILED DESCRIPTION

The two embodiments differ only in the type of sealing, which is why the same reference signs are used for both embodiments, and unless otherwise described, the same reference signs also designate the same or structurally comparable parts.

Figure 1:
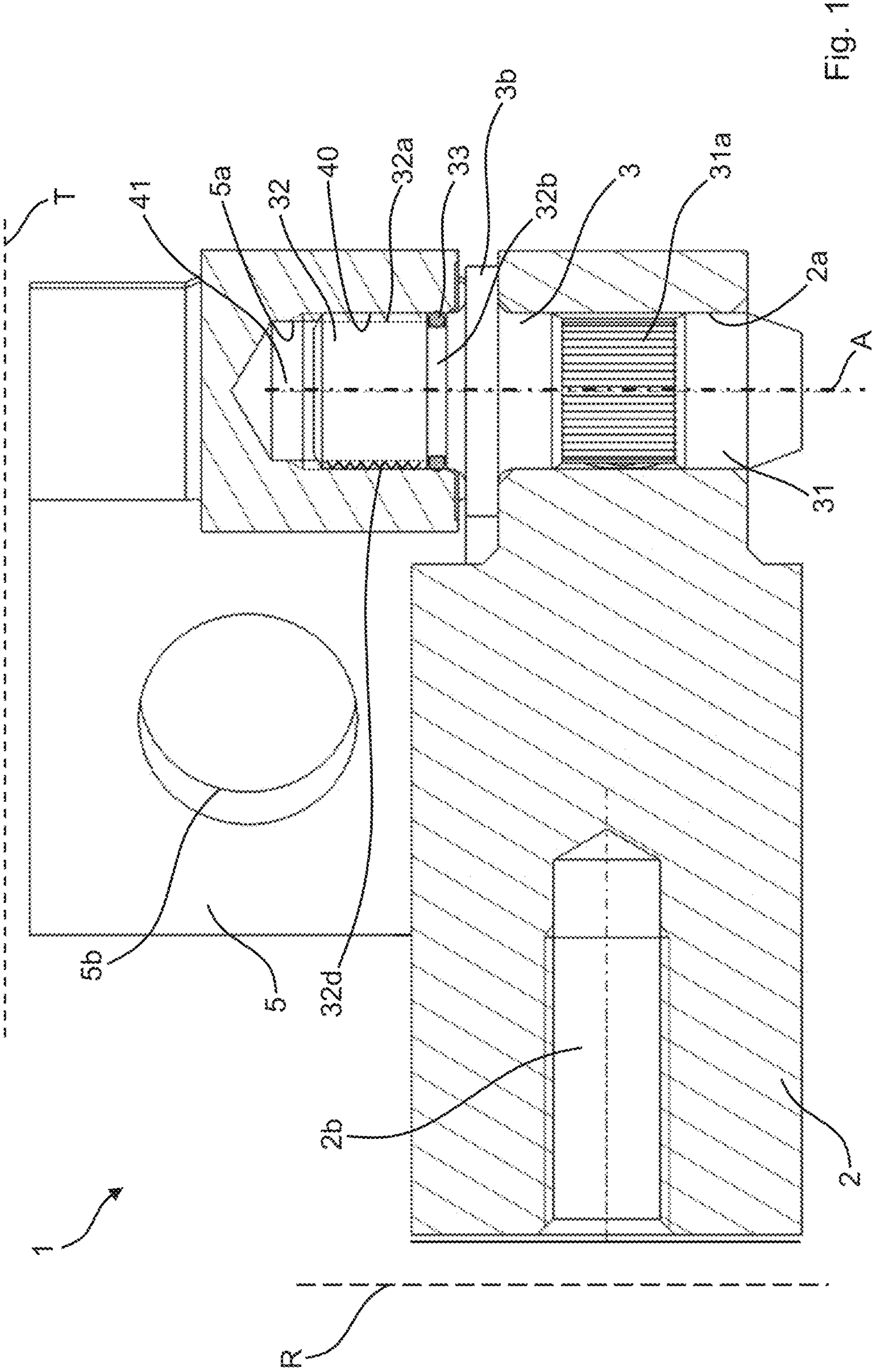
FIG. 1 shows a longitudinal sectional view through a first preferred embodiment of an automobile hinge.

In FIG. 1, the automobile hinge 1 is shown in a longitudinal section. It can be seen that the automobile hinge 1 comprises a first hinge half 2 connectable to a frame or door pillar R, shown as a dashed line, and further comprises a second hinge half 5 connectable to a door T, shown as a dashed line. The first hinge half 2 comprises a through hinge bore 2*a*, and the second hinge half 5 comprises a second hinge bore 5*a* formed as a blind bore. It can be seen that the hinge halves 2, 5 also each have an opening 2*b*, 5*b* which is intended for fastening to the door pillar R and the door T, respectively. For this purpose, screw bolts can be used in the usual manner. The first hinge half 2 is designed in the present case as a body part, and the second hinge half 5 is designed in the present case as a door part.

The automobile hinge 1 further comprises a hinge pin 3, which comprises a radial collar 3*b* approximately centrally. Below the radial collar 3*b*, the hinge pin 3 comprises a first pin portion 31 which passes through the continuous first hinge bore 2*a*. In a central region, the first pin portion 31 has a slightly recessed central portion 31*a* provided with a circumferential knurl. At the level of the central portion 31*a*, a radial bore 2*c* opens into the hinge bore 2*a*, which radial bore 2*c* has an internal thread into which a grub screw 21 can be screwed for rotationally fixed retention of the first pin portion 31 in the hinge bore 2*a*. The grub screw 21 can be tightened by hand or with a tool, and comes into contact with the knurling in the central portion 31*a* with its dome-shaped end face 21*a* and secures the hinge pin 3 in the hinge bore 2*a*. The grub screw 21 can be easily loosened again to allow the first hinge half 2*a* to be detached from the hinge pin 3. The main axis A of the hinge pin 3 is also the axis of rotation or pivot of the automobile hinge 1.

Above the radial collar 3*b*, the hinge pin 3 comprises a second pin portion 32 which has an external thread 32*a* formed as a fine thread M10×1.0 on its outer circumference. A circumferential groove 32*b* is formed below the external thread 32*a*, in which an O-ring 33 made of EPDM is inserted.

The second hinge bore 5*a* has an internal thread 40 which meshes with the external thread 32*a* and is also formed as a fine thread M10×1.0, the direction of rotation of the internal thread 40 and external thread 32*a* being the same. It can further be seen that the second hinge bore 5*a* has an axial protrusion with respect to the maximum height of the second pin portion 32, which protrusion forms a receiving area 41 for lubricant, in the present case lubricating grease, with which the pivoting movement between the internal thread 40 and the external thread 32*a* is improved. The O-ring 33 seals the two threads in the direction of the collar 3*b* and prevents the lubricating grease from leaking.

The second pin portion 32, equipped with an external thread M10×1.0, has a nominal diameter of 10 mm. The height of the thread over the circumference is also 10 mm.

It can be seen that it is also possible to form the second hinge bore 5*a* as a through bore. In that case, another O-ring 33 is provided in an upper portion of the second pin portion 32 to seal the grease receiving portion on both sides.

Figure 2:
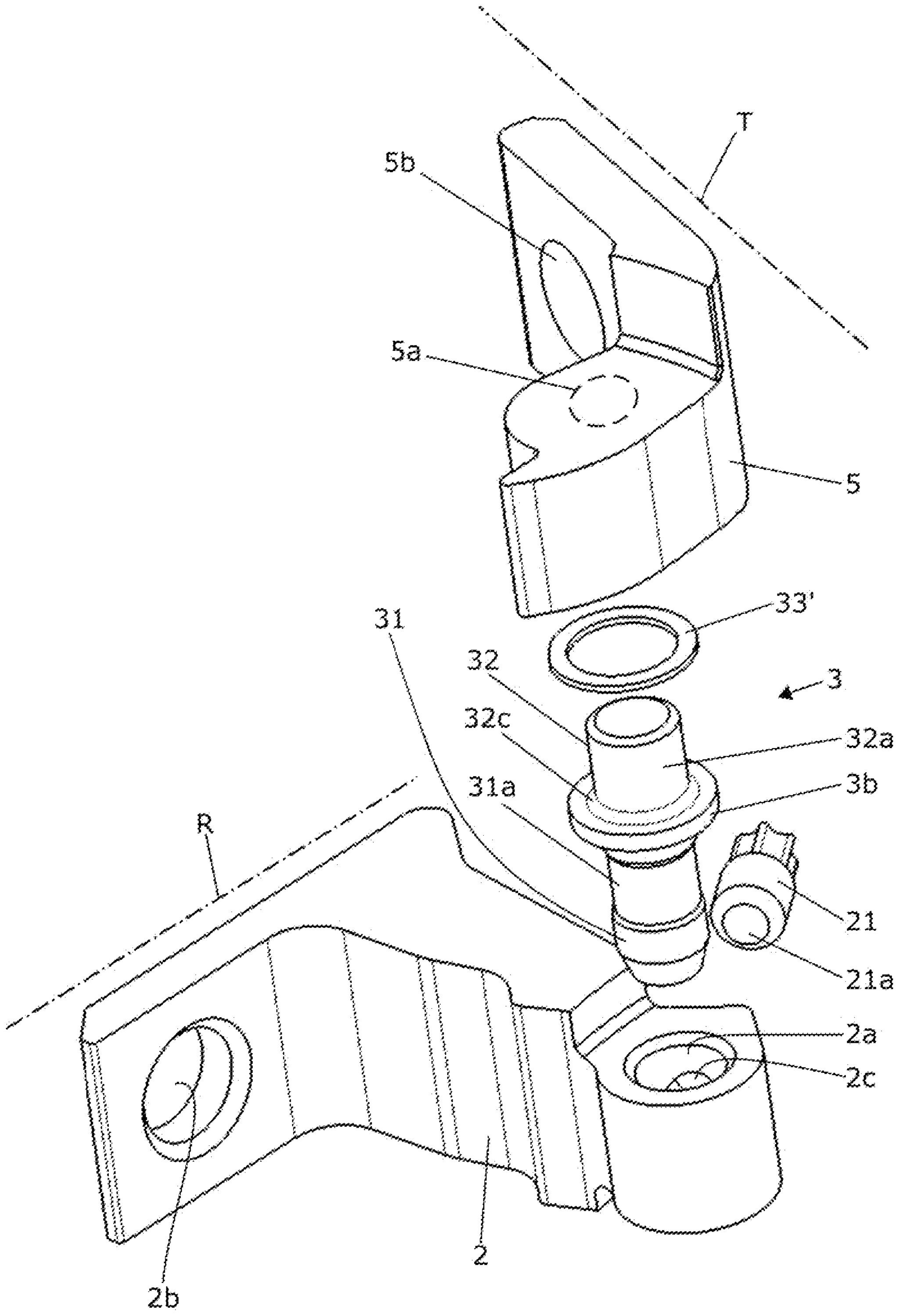
FIG. 2 shows an exploded view of a further preferred embodiment of a preferred automobile hinge.

The automobile hinge 1 according to FIG. 2 differs essentially only in the type of sealing. Instead of the O-ring 33, an annular washer 33' made of EPDM is provided, which rests on the surface of the radial collar 3*b* facing the second hinge half 5. In this case, the annular washer 33' is sufficiently thick that it is compressed to a certain extent when the automobile hinge 1 is in the closed position and, when the automobile hinge 1 is opened by pivoting the second hinge half 5 about the threaded pairing 32*a*/40, expands to such an extent that the threaded pairing 32*a*/40 and thus the receiving area 41 for the lubricating grease continue to be sealed against leakage.

Between the end face of the radial collar 3*b* facing the second hinge half 5 and the external thread 32*a*, a rounded portion 32*c* is provided to provide a line of contact with the end face of the opening of the hinge bore 5*a* facing the radial collar 3*b*.

The automobile hinge 1 can be disassembled in a simple manner by loosening the grub screw 21 and pulling the hinge pin 3 out of the first hinge half 2, and by unscrewing the hinge pin 3 with its pin portion 32 from the internal thread 40 of the second hinge bore 5*a* of the second hinge half 5. Accordingly, the parts can be reused in a simple manner and, if necessary, disposed of according to type.

The hinge pin 3 is produced by cold forming, the external thread 32*a* being produced by rolling. The hinge halves 2 and 5 are each made of steel as forgings. The hinge pin 3 is also made of steel, for example C15.

It can be seen that the pivoting mobility is provided by the internal thread 40 and the external thread 32*a*, without any more need for a bearing bush for this purpose. It can further be seen that riveting of the hinge pin to connect it to at least one of the hinge halves 2, 3 is also no longer required. The automobile hinge 1 resists substantially higher tearing forces in the vertical direction (Z-direction) compared to hinges lined with a bearing bush which are riveted, so that the crash properties of the automobile hinge 1 are improved.

The present disclosure has been explained above with reference to an embodiment in which the second hinge bore 5*a* of the second hinge half 5 is formed as a blind bore. It has to be understood that the second hinge bore 5*a* may also be formed as a through bore. Similarly, the first hinge bore 2*a* formed as a through bore may also be formed as a blind bore.

The present disclosure has been explained above with reference to an automobile hinge 1 which has been realized as a single joint, in which, therefore, the hinge halves 2; 5 are each directly connected to the door T and to the door pillar R, respectively. It has to be understood that the automobile hinge 1 may also have more than one articulation, for example in the case of a four-bar linkage, in which case the articulated connection is made between one of the hinge parts and one of the links, which in turn is articulated to the other hinge part. The automobile hinge 1 may be used in attaching a door or any other flap to a vehicle, notwithstanding the orientation of the axis of rotation. In particular, while in case of a flap configured as a door, the axis of rotation will be substantially vertical, the axis of rotation might as well be horizontal, for example if a trunk lid is attached to the vehicle. Accordingly, the terms door and door pillar have to be interpreted to encompass any type of flap and vehicle body part to which the flap is to be attached, including but not limited to front side doors, back side doors, trunk lids, front opening hood, sliding doors, and combinations thereof.

The present disclosure has been explained above with reference to an embodiment in which the slight stroke resulting from the pivoting movement about the intermeshing threads is compensated for by the inherent elasticity of the sealing ring. It has to be understood that a spring arrangement, for example an undulating spring or a disc spring, can also be arranged between the sealing ring 33' and the collar 3*b*, which further ensures the tracking of the sealing ring for sealing the receiving area for the lubricating grease in a particularly reliable manner.

The present disclosure has been explained herein with reference to embodiments in which exactly one of the pin portions 32 is connected to the hinge half 5*a* forming a door portion by an external thread 32*a*. It has to be understood that the hinge half 2 forming a body part may also have an internal thread into which the pin portion having an external thread can be screwed.

The present disclosure has been explained here on the basis of embodiments in which the radial collar 3*b* projects radially over the circumference of the pin portions in the form of a disc. It has to be understood that the collar 3*b* can also have a contour optimized for the application of a tool, for example as a hexagon, to which an open-end wrench can be applied in order to be able to screw the pin portion 32 with an external thread 32*a* completely into the internal thread 40 and, if necessary, to overcome a restoring force of the sealing arrangement 33'.

The present disclosure has been explained herein with reference to embodiments in which exactly one of the pin portions 32 with an external thread 32*a* is connected to the second hinge half 5 forming a door part, while the other, first hinge half 2 is fixed by means of a set screw 21. It has to be understood that the connection of the first pin portion 31 to be non-rotatably connected to the first hinge half 2*a* may also be made by a thread pairing, in that the first pin portion 31 also has an external thread, and the hinge bore 2*a* also has an internal thread, so that the external thread of the first pin portion 31 is screwable into the internal thread of the hinge bore 2*a*. To ensure that the non-rotatable thread pairing is not loosened when the door T is actuated, the non-rotatable thread pairing may have a different thread direction than the pivotable thread pairing. Furthermore, the non-rotating thread pairing may be additionally secured against rotation. A hinge pin with such two external threads with opposite pitches (one left-hand thread, one right-hand thread) can advantageously then be used both in an automobile hinge for a left-hand door and in an automobile hinge for a right-hand door.

The present disclosure has been described above with reference to an embodiment in which the axes of the pin portions 31, 32 coincide. It has to be understood that the axes of the pin portions may also be offset but parallel, in which case one of the axes of the pin portions coincides with the pivot axis of the automobile hinge.

What is claimed is:

1. An automobile hinge, comprising a first hinge half attachable to one of a door and a door pillar, the first hinge half comprising a first hinge bore, a second hinge half attachable to the other of the door and the door pillar, the second hinge half comprising a second hinge bore, and a hinge pin having an axis of rotation, wherein the hinge pin comprises a first pin portion which can be fixed in a rotationally fixed manner in the first hinge bore of the first hinge half, wherein the hinge pin comprises a second pin portion which is pivotally received in the second hinge bore of the second hinge half, wherein the second pin portion comprises an external thread at least in sections, wherein the second hinge bore of the second hinge half comprises an internal thread at least in sections, wherein the second pin portion can be screwed into the second hinge bore of the second hinge half, and wherein the internal thread of the second hinge bore and the external thread of the second pin portion form a direct pivotal connection of the hinge pin and the second hinge half, wherein the internal thread the external thread are formed as fine threads with a fine pitch.

2. The automobile hinge according to claim 1, wherein the fine threads have a pitch of less than a quarter of a conventional metric thread.

3. The automobile hinge according to claim 1, wherein the second hinge bore of the second hinge half comprises a receiving area for a lubricant.

4. The automobile hinge according to claim 1, wherein the second hinge bore is designed as a blind bore in the second hinge half.

5. The automobile hinge according to claim 1, wherein the external thread comprises between three and thirty complete turns.

6. The automobile hinge according to claim 1, wherein the external thread comprises a maximum of three thread starts.

7. The automobile hinge according to claim 1, wherein a sealing arrangement is provided to secure the internal and external threads against leakage of lubricant.

8. The automobile hinge according to claim 1, wherein the hinge pin comprises a radial collar between the first pin portion and the second pin portion, and wherein a transition area between the external thread and the radial collar comprises a rounding.

9. The automobile hinge according to claim 8, wherein the sealing arrangement comprises an annular sealing washer on an end face of the radial collar facing the second pin portion, which secures the internal and external threads against leakage of lubricant.

10. The automobile hinge according to claim 1, wherein the internal thread of the second hinge bore and the external thread of the second pin portion is designed in such a way that an increasing pitch must be overcome during an opening movement of the door, while a closing movement of the door resulting in a closing aid that supports the door falling into a lock.

11. The automobile hinge according to claim 1, wherein the second hinge bore and the second pin portion are radially contacting each other.

12. The automobile hinge according to claim 1, wherein the second pin portion has a nominal diameter, and wherein a height of the internal thread over a circumference of the second pin portion is equal to a value obtained by multiplying a factor selected from a range ranging from 0.8 to 1.2 with said nominal diameter.

13. An automotive hinge, comprising a first hinge part assigned to one of a flap and a vehicle body part, the first hinge part comprising a first hinge bore, a second hinge part assigned to the other of the flap and the vehicle body part, the second hinge part comprising a second hinge bore, and a hinge pin having an axis of rotation, wherein the hinge pin comprises a first pin portion which is fixed in a rotationally fixed manner in the first hinge bore of the first hinge part, wherein the hinge pin comprises a second pin portion which is pivotally received in the second hinge bore of the second hinge part, wherein the second pin portion comprises at least one external thread, wherein the second hinge bore of the second hinge part comprises at least one internal thread, wherein the at least one external thread of the second pin portion can be screwed into the at least one internal thread of the second hinge bore of the second hinge part, and wherein the internal thread of the second hinge bore and the external thread of the second pin portion co-operate to a direct pivotal connection of the hinge pin and the second hinge part, wherein the internal thread and the external thread are formed as fine threads with a fine pitch.

14. The automotive hinge according to claim 13, wherein the first pin portion comprises an external thread, wherein the first hinge bore of the first hinge part comprises an internal thread, and wherein the external thread of the first pin portion is screwed into the internal thread of the first hinge bore to secure the first pin portion in a rotationally fixed manner in the first hinge bore of the first hinge part.

15. The automotive hinge according to claim 14, wherein a thread direction of the first pin portion is opposite of a thread direction of the second pin portion.

16. The automotive hinge according to claim 13, wherein the hinge pin comprises a radial collar between said first pin portion and said second pin portion, the radial collar being arranged between the first hinge part and the second hinge part.

17. The automotive hinge according to claim 13, wherein the automotive hinge can be disassembled from at least the second hinge part by unscrewing without destroying a riveted connection.

18. An automobile hinge, comprising a first hinge half attachable to one of a door and a door pillar, the first hinge half comprising a first hinge bore, a second hinge half attachable to the other of the door and the door pillar, the second hinge half comprising a second hinge bore, and a hinge pin having an axis of rotation, wherein the hinge pin comprises a first pin portion which can be fixed in a rotationally fixed manner in the first hinge bore of the first hinge half, wherein the hinge pin comprises a second pin portion which is pivotally received in the second hinge bore of the second hinge half, wherein the second pin portion comprises an external thread at least in sections, wherein the second hinge bore of the second hinge half comprises an internal thread at least in sections, wherein the second pin portion can be screwed into the second hinge bore of the second hinge half, and wherein the internal thread of the second hinge bore and the external thread of the second pin portion form a direct pivotal connection of the hinge pin and the second hinge half wherein one of the internal thread of the second hinge bore and of the external thread of the second pin portion comprise flanks provided with a sliding coating reducing a braking torque, wherein the internal thread and the external thread are formed as fine threads with a fine pitch.

* * * * *